United States Patent [19]

McIntosh

[11] Patent Number: 4,569,670
[45] Date of Patent: Feb. 11, 1986

[54] VARIABLE PULLEY ACCESSORY DRIVE

[75] Inventor: Arthur M. McIntosh, Arlington Heights, Ill.

[73] Assignee: Borg-Warner Corporation, Chicago, Ill.

[21] Appl. No.: 615,630

[22] Filed: May 31, 1984

[51] Int. Cl.[4] .................................... F16H 11/06
[52] U.S. Cl. .................................. 474/16; 474/28
[58] Field of Search ............... 474/16, 18, 11–13, 474/28

[56] References Cited

U.S. PATENT DOCUMENTS

| | | | |
|---|---|---|---|
| 2,909,071 | 10/1959 | Smyth et al. | 474/16 |
| 3,403,567 | 10/1968 | Bruet | 474/28 |
| 3,893,343 | 7/1975 | Zaiser et al. | 74/230.17 |
| 3,906,808 | 9/1975 | Zaiser et al. | 474/16 |
| 4,100,818 | 7/1978 | Woollard | 74/230.17 |
| 4,228,691 | 10/1980 | Smirl | 474/28 X |
| 4,229,988 | 10/1980 | Rattunde | 474/28 |
| 4,345,664 | 8/1982 | Anno et al. | 474/13 X |
| 4,384,862 | 5/1983 | Nakane | 474/13 |
| 4,410,312 | 10/1983 | Thirion de Briel | 474/13 |

Primary Examiner—James A. Leppink
Assistant Examiner—Thuy M. Bui
Attorney, Agent, or Firm—James A. Geppert

[57] ABSTRACT

An accessory drive especially adapted for use with internal combustion engines having a crankshaft is described. The drive comprises a variable pulley transmission having a pair of spaced pulleys drivingly interconnected by a power transmission belt. The pulley transmission having a driver pulley drivingly connected to an engine crankshaft. The driven pulley includes a pair of pulley flanges, one flange is axially movable with respect to the other flange, the driven pulley also comprises a pair of pulley flanges, one of which is axially movable with respect to the other flange. The spacing of the flanges of the drive and driven pulleys determines the drive ratio between the pulleys. Another pulley is connected to the driven pulley, to drive the accessories. A drive pulley spring urges the drive pulley flanges axially toward one another, and a driven pulley spring urges the driven pulley flanges toward one another. An hydraulic piston, connected to the drive pulley movable flange and acted upon by engine lubricating oil, displaces the drive pulley movable flange with respect to its other flange. An hydraulic governor responsive to engine speed controls the supply of engine lubricating oil to the piston.

A one-way clutch can be interposed between the accessory pulley and the drive shaft which permits the pulley to freewheel during upshifts.

5 Claims, 5 Drawing Figures

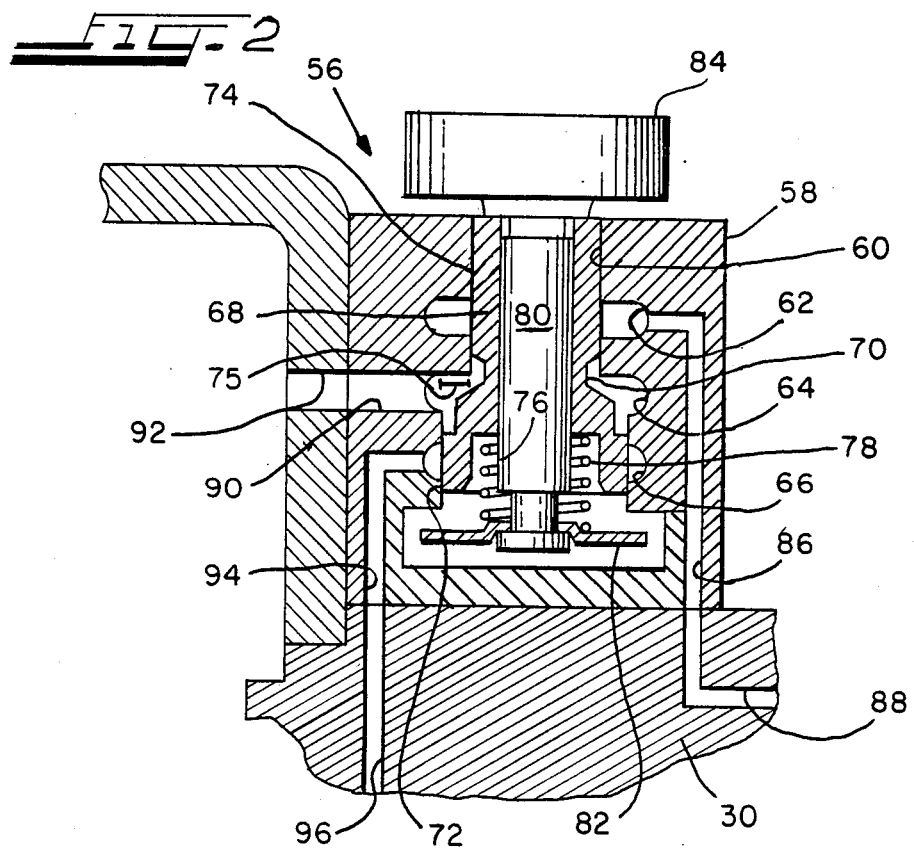
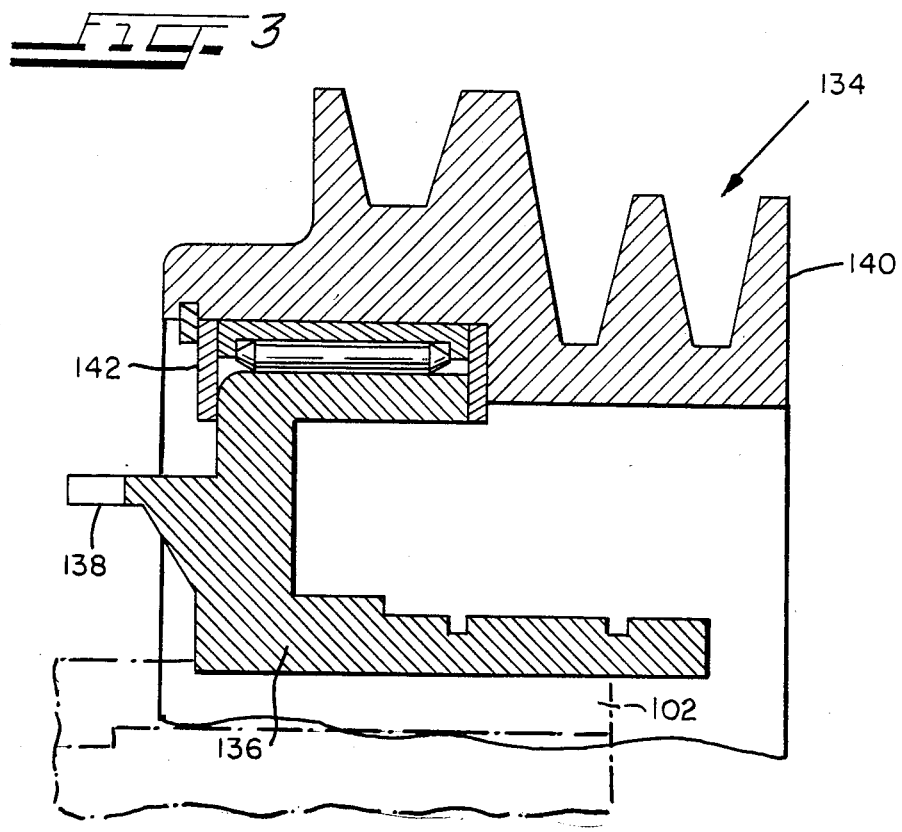

VARIABLE PULLEY ACCESSORY DRIVE

BACKGROUND OF THE INVENTION

Modern vehicle engines have been called upon to supply energy for an increasing number of accessories, some of which are for passenger comfort and convenience, and some of which are for vehicle operation and safety, as for example, air conditioning, alternators, engine fans, power steering pumps and power brake devices. Generally each accessory is energized from a component which has an optimum rotational speed; ideally, each component should be driven at that optimum speed. This is not practical because of the relatively high costs of such drives, and the amount of space which would be necessary for such drives. If an accessory drive system is constructed to drive accessories at speeds which are directly proportional to either engine speed or vehicle ground speed, the accessories must be constructed to withstand maximum running speeds and, in all probability, the accessories will not be operated at their optimum conditions. Energy is wasted when the components are driven at a speed above the optimum value. Thus it has been proposed to construct an accessory drive system in which the driven speed of the accessory power system or energy translator generally increases at a rapid rate until the driven speed reaches a certain, predetermined desirable speed at engine idle, after which the accessory supplies are driven at a substantially constant speed. This constant speed, under ideal circumstances, closely matches the optimum drive speed. By doing so, the accessory drive system can be constructed for optimum performance and life, and at reasonable cost. Also, fuel is not wasted driving the accessory power supplies at excessive speeds. Some accessory drive packages use a pair of pulleys in a "variable pulley" system. An example of such an accessory drive system is described and claimed in Woolard U.S. Pat. No. 4,100,818, issued July 18, 1978. Woolard's pulley arrangement utilizes centrifugal force to vary the drive ratio between the pulleys of the pulley arrangement. The centrifugal force acting on a plurality of weights causes a pulley flange to move axially relative to the other flange of the pulley. The upper limit of the ratio change is determined by the limit of movement of the weights.

In the Woolard system, the drive and driven pulleys rotate at a fixed ratio at relatively low motor speeds up to a predetermined speed at which time the weights attached to the spring of the driven pulley begin to move outwardly. As they move, there is a change in axial spacing between the pulley flanges of each pulley. The drive pulley continues to rotate at the same speed as the drive shaft while the driven pulley (to which the accessory power supply is attached) rotates at a substantially uniform speed. This condition prevails until the drive shaft speed becomes very high at which time the weights have reached their outermost limit and the spring has "bottomed out". Thereafter the speed of the driven pulley increases with further increases in the drive shaft speed but at a reduced lower ratio as compared to the first drive ratio.

Another accessory drive system is described and claimed in U.S. Pat. No. 3,893,343 issued July 8, 1975. The drive arrangement comprises a variable "V-belt transmission" which provides a speed-up at low rotational speeds of the crankshaft and which automatically reduces the speed-up ratio with increasing rotational speeds of the crankshaft by means of a piston which is associated with the driving pulley of the transmission and which displaces the movable pulley member against spring action. The piston is acted upon directly by unmodulated lubricating oil pressure from the internal combustion engine oil pump together with the pressure developed by the oil contained in a large diameter driving pulley cylinder as it is rotated at crankshaft speeds. Accessory speeds are increased at idle but the large diameter piston forces available at speeds above idle quickly changes the belt ratio, and prevents efficient use of the transmission.

SUMMARY OF THE INVENTION

The accessory drive of this invention is an improvement over the accessory drive shown in U.S. Pat. No. 3,893,343, and uses a piston associated with the driving pulley of a variable pulley transmission to displace or move the movable pulley flange against spring action. The drive ratios between the driven pulley (and thus the accessory power supplies) and the drive pulley are similar to those described with respect to the Woolard patent, U.S. Pat. No. 4,100,818. Unlike the patented structure, especially that of U.S. Pat. No. 3,893,343, the drive of this invention uses an hydraulic governor to modulate the engine oil pressure. This control or modulation arrangement is superior to the patented device because it permits controlled changes in pulley speed ratios and, also, prevents premature shifts into underdrive, i.e., a condition when the drive pulley flanges are spaced apart and the driven pulley flanges are together. The opposite of that ratio is desired when the engine is idling at relatively low engine speeds. The performance of the governor is not seriously influenced by variations in oil temperature, oil viscosity, oil pump pressure and wear; oil pump pressure rises rapidly with engine speed almost to the regulated maximum pressure at idle speed, so that the range of ratio control in the patented arrangement is severely limited even at idle speeds. Many operational options are available by changing the weight/spring assembly forming a part thereof.

In addition to the hydraulic governor, the drive arrangement of this invention can utilize a one way clutch between the driven shaft and the accessory pulley(s) which allows the accessories to freewheel during upshifts, thus reducing the load on the belt of the drive and consequently conserving energy.

BRIEF DESCRIPTION OF THE DRAWINGS

FIG. 2 is an enlarged cross-sectional view of an hydraulic governor illustrated generally in FIG. 1;

FIG. 3 is a partial cross-sectional illustration showing a one-way clutch bearing between the driven shaft and the accessory pulley;

DESCRIPTION OF THE PREFERRED EMBODIMENT

Figure 1:
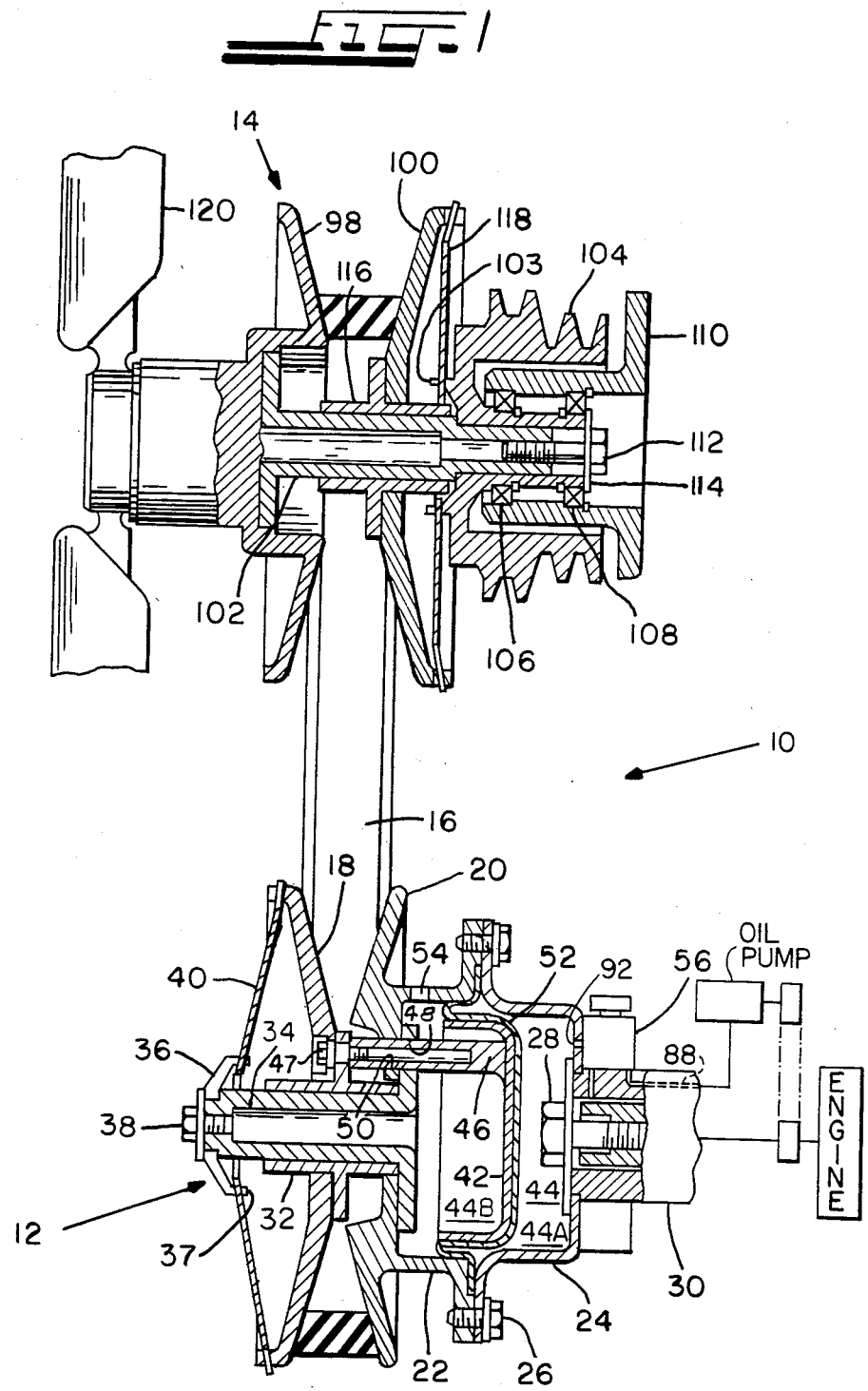
FIG. 1 is a partial longitudinal cross-sectional view through an accessory drive arrangement constructed accordingly to this invention.

The accessory drive system 10 of this invention is of the variable pulley type as illustrated in FIG. 1 and comprises a drive pulley 12 and a driven pulley 14 drivingly interconnected by a power transmission belt 16. Drive pulley 12 comprises an axially movable flange 18 and an axially fixed flange 20, the fixed flange 20 having a rearwardly extending flanged, cylindrical part 22 connected to a generally cylindrical flange member 24 by a plurality of machine screws 26 and bolted by machine bolt 28 to the crankshaft 30 driven by an engine (FIG. 1). The axially movable flange 18 has a hub 32 slidably received on a flanged stub shaft 34 to which a spider 36 is attached by a machine screw 38. A Belleville spring 40 connected to tangs 37 of the spider 36 and the outside of the flange 18, biases the flange 18 toward the flange 20. A piston 42 in a cavity 44 formed by the cylindrical part 22 and the flange member 24 has a plurality of relatively long, forwardly extending, cylindrical spacers 46 connected to hub 32 by bolts 47, each spacer 46 being slidably received in suitable openings 48, 50 in the stub shaft 34 and axially fixed flange 20, respectively. The spacers 46 and their relation to the pulley flanges insures concurrent rotation of the axially movable flange 18 with the flange 20. A flexible diaphragm 52 is sealed between the parts 22 and 24 and is attached to the piston 42. The diaphragm divides the cavity 44 into a pressure space 44A and a vented space 44B. The space 44B is vented to the atmosphere by a vent opening 54 in the part 22.

A counterbalanced, two stage hydraulic governor 56 (FIG. 2) is connected to the crankshaft 30 and controls the flow of modulated engine crankcase oil through passage 90 and opening 92 into the pressure space 44A. The hydraulic governor 56 comprises a housing or body 58 with a radial bore 60 intersected by ports 62, 64 and 66. A generally cylindrical valve spool 68 is slidably received in bore 60 and has an encircling groove 70 between a first land 72 of a first diameter and a second land 74 of a second and smaller diameter. The difference between the two valve spool diameters provides differential area 75, the function of which will be later described. The valve spool 68 also has a pocket 76 to receive a coil spring 78 surrounding a radial, cylindrical stem 80 carrying at one end a washer 82 to constrain the spring 78, and a flyweight 84 at the other and radially outwardly end.

Port 62 is connected to passageway 86 which in turn is connected to passageway 88 in the crankshaft 30. Passageway 88 is connected to the engine oil pump of FIG. 1 for the flow of engine crankcase oil to the port 62. Port 64 is connected to an axially oriented passage 90 and opening 92 in flange member 24. Port 64, passage 90 and opening 92 permit the flow of modulated crankcase oil to pressure chamber 44A when ports 64 and 62 are connected by means of groove 70, thus moving pulley flange 18 axially relative to pulley flange 20. Port 66 is connected to passageway 94 in housing 58 and to passageway 96 in the crankshaft 30 to permit the return flow of oil to the crankcase when the groove 70 of the valve spool 68 bridges the ports 66 and 64.

The driven pulley 14 (FIG. 1) comprises an axially fixed flange 98 and an axially movable flange 100, the former being connected to a stub shaft 102 carrying a multiple groove pulley 104 journalled in spaced bearings 106, 108 in a support 110 fixed to the vehicle (not shown).

A machine screw 112 and washer 114 position the pulley 104 and splined stub shaft 102 with respect to the support 110. The axially movable flange 100 is connected to a hub 116 axially slidable on stub shaft 102. A Belleville spring 118, which may have the same or a different spring rate than spring 40, is connected at its central portion to tangs 103 of the pulley 104 and at its outer rim to the rim of the pulley flange 100. The spring 118 biases the axially movable flange 100 toward the axially fixed flange 98, and the multiple groove pulley 104 is the driving pulley for the accessories (not shown). The cooling fan 120 for the engine is connected to the axially fixed pulley 98.

Alternatively, as shown in FIG. 3, a two piece multiple pulley system 134 can be substituted for the pulley 104 in the FIG. 1 embodiment. The pulley system 134 comprises a hub member 136, which encircles and is connected to the stub shaft 102 (a portion of which is shown in broken lines), having tangs 138 for engaging the Belleville spring 118. The system 134 also comprises a multiple pulley 140 which encircles hub member 136. A one way clutch/bearing 142 of conventional construction is located between hub member 136 and pulley 140 and permits pulley 140 to freewheel during upshifts.

OPERATION

To explain the operation of the accessory drive of this invention, reference is made to FIGS. 1, 2, 4 and 5. Also, it should be understood that the pressure of the oil from the pump (pump pressure) is regulated to provide uniform pressure over the engine operating speed range in a conventional manner by using a pressure regulator valve in the system. As such, pump pressure (see FIG. 4) rises at a rapid rate as engine speed increases to slightly above idle speed (in the example illustrated) after which it becomes substantially uniform for engine speeds above idle speed. The point at which the pump pressure levels off is determined by the pressure regulator valve, pump displacement and the lubricating load.

Figure 4:
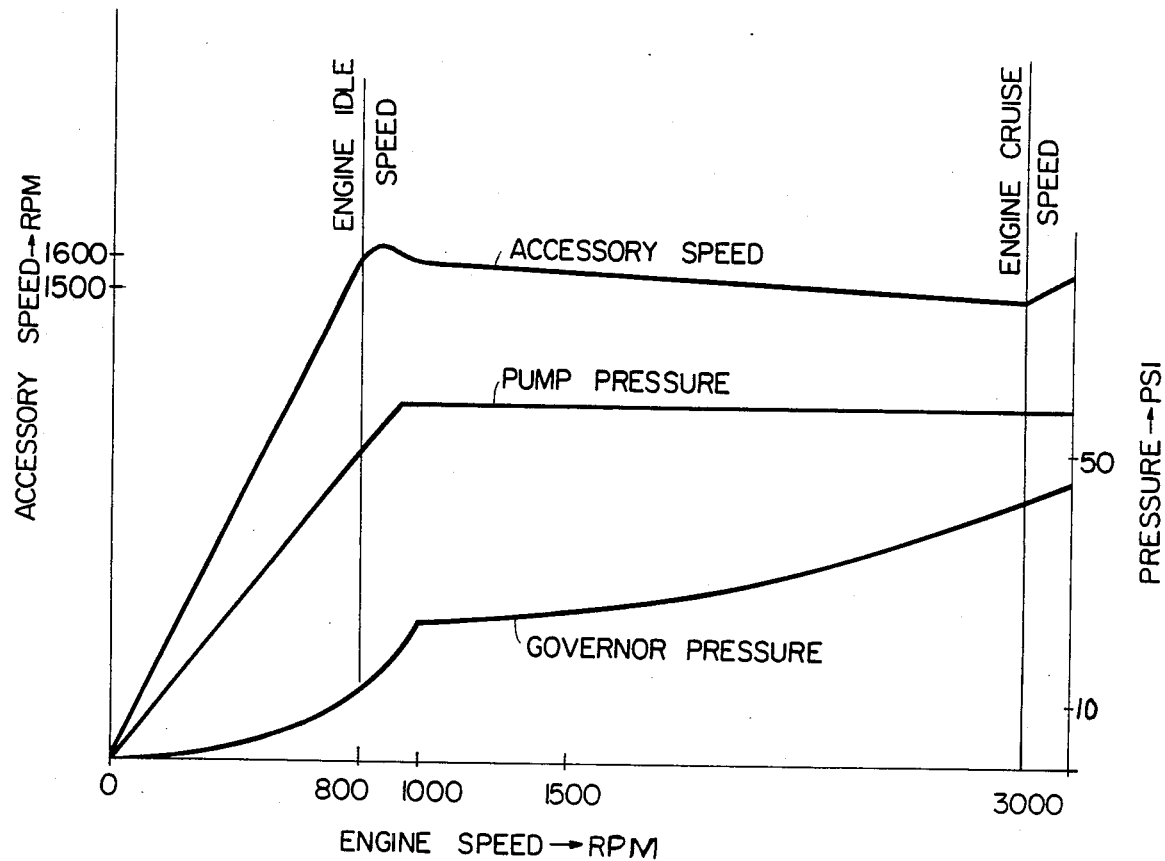
FIG. 4 is a graph illustrating the idealized relational of accessory speed, oil pump pressure and governor pressure to engine speed.

The rotational speed of the accessory pulley 104, identified as "Accessory Speed" in FIG. 4, rises sharply to a top speed which occurs at about engine idle speed and then it levels off and remains fairly constant between idle and 3000 rpm. The accessory speed then rises at a rate less sharp above 3000 rpm.

Oil pressure operating on the differential area 75 (FIG. 2) of the valve spool 68 balances the forces of the governor weight 84 and associated components for each speed of rotation of the crankshaft 30. The initial rapid pressure rise is the result of rapid changes in the length of spring 78 which permits the weight 84 to move out quickly to a larger spinning radius. This action increases the rate of pressure rise shown in the first stage "governor" pressure curve of FIG. 4. At the transition of the first and second curve segments, the spring 78 has bottomed, so that the spring 78 no longer has an effect on the governor pressure variation.

The rate of governor pressure rise decreases in the second curve segment because the weight 84 and associated components rotate at a more or less fixed radius and thus no longer move out rapidly relative to the spool valve control overlapping ports.

As the engine speed decreases, as when the vehicle is preparing to stop, the governor pressure theoretically follows the same curve in reverse order. As the governor pressure in chamber 44A increases with an increase in engine speed, the pulley flange 18 is moved axially away from the pulley flange 20 to thus change the drive ratio between the pulleys 12 and 14.

Figure 5:
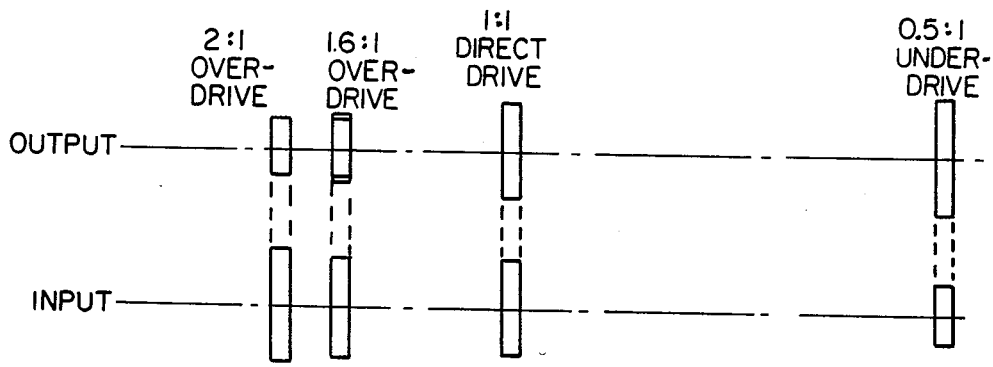
FIG. 5 is a chart illustrating the idealized ratio relationship between the pulleys of the pulley transmission at selected engine speed.

The relative drive ratios of the pulleys is correlated to the engine speeds in FIG. 5. In the example illustrated the maximum underdrive ratio occurs at about an engine speed of 3000 rpm, and is the same for engine speeds above 3000 rpm because of the limits imposed by the pulley designs. Pulley ratio changes are controlled gradually by the governor between overdrive and underdrive.

While the invention has been described with reference to two embodiments, it is to be understood that they are intended to cover reasonable equivalents.

I claim:

1. A variable pulley transmission associated with an engine driving a lubricating oil pump to provide oil under pressure comprising:

a first cone pulley constructed of a pair of flanges, one of which is axially movable with respect to the other, said first cone pulley being rotatably driven by said engine;

means comprising a chamber operatively associated with said axially movable flange of said first pulley to receive lubricating oil under pressure to axially move said flange relative to the other flange;

a second cone pulley constructed of a pair of flanges, one of which is axially movable with respect to the other, said second cone pulley being spaced from said first cone pulley and having its axis of rotation generally parallel to the axis of rotation of said first cone pulley;

a power transmission belt drivingly connecting said pulleys and providing different drive ratios therebetween depending upon the axial positions of the pulley flanges;

spring means biasing the movable flange of each pulley toward the other flange thereof; and means operative to control the flow of lubricating oil under pump pressure to said chamber as a function of the speed of the engine to axially move the movable flange of the first cone pulley with respect to the other flange thereof against the force of the biasing spring means to change the spacing between the flanges and thus control the drive ratio between the pulleys over an extended engine speed range, said means comprising an hydraulic governor connected to an engine crankshaft and being subject to centrifugal force to effect the oil flow control.

2. A variable pulley transmission as recited in claim 1, wherein the spring means for the first cone pulley has a spring rate different from that for the second cone pulley.

3. A variable pulley transmission as recited in claim 1, further comprising a pulley means connected to be driven by said second cone pulley for driving accessories associated with said engine.

4. A variable pulley transmission as recited in claim 3, further comprising a one-way clutch in the drive connection between said pulley means and said second cone pulley, permitting freewheeling of said pulley means under some drive conditions.

5. A variable pulley transmission as recited in claim 1 wherein said hydraulic governor is so constructed and arranged to provide a substantially constant speed for said pulley means between certain predetermined engine speeds.

* * * * *